United States Patent
Dammann et al.

Patent Number: 6,113,865
Date of Patent: Sep. 5, 2000

[54] REACTOR CONFIGURATION FOR A LIQUID GASIFICATION PROCESS

[76] Inventors: Wilbur A. Dammann, 1115 Carriage Rd., Papillion, Nebr. 68046; W. David Wallman, 1350 Northface Ct., Colorado Springs, Colo. 80919

[21] Appl. No.: 09/244,602

[22] Filed: Feb. 4, 1999

Related U.S. Application Data

[60] Provisional application No. 60/073,818, Feb. 5, 1998.
[51] Int. Cl.$^7$ ..................................................... B01J 19/08
[52] U.S. Cl. ......................................................... 422/186.21
[58] Field of Search ...................... 422/186.21; 204/164, 204/172

[56] References Cited

U.S. PATENT DOCUMENTS

| | | | |
|---|---|---|---|
| 5,159,900 | 11/1992 | Dammann | 123/3 |
| 5,417,817 | 5/1995 | Dammann et al. | 204/129 |

*Primary Examiner*—Kishor Mayekar
*Attorney, Agent, or Firm*—Koley Jessen P.C.; Mark D. Frederiksen

[57] ABSTRACT

The reactor configuration for a liquid gasification process includes an apparatus for liquid gasification such as that described in U.S. Pat. No. 5,159,900. Included in the apparatus for liquid gasification are a reaction chamber at least partially filled with liquid, a pair of electrodes, and means for creating an electrical arc between the electrodes. When the electrical arc is struck, carbon in the reaction chamber is ionized and vaporized while energy is dissipated in the form of high intensity light radiation. Electrons pass though the vaporized carbon, causing the carbon vapor to oxidize or burn releasing $COH_2$ gas. The displacement of oxygen in the liquid by forced rapid oxidation is an endothermic reaction. The electrodes are spaced-apart so that the arc is located generally in the center of the reaction chamber. The interior of the reaction chamber is generally spherical in shape and is light reflective, so as to prevent dissipation of light energy. Optionally, the reaction chamber is pressurized to further enhance the efficiency of the reaction.

6 Claims, 3 Drawing Sheets

ILLUSTRATION OF DIRECT REFLECTIONS WITH POINT SOURCE OFF SPHERICAL CENTER

ILLUSTRATION OF DIRECT REFLECTIONS
END VIEW ALWAYS ON SPHERICAL CENTER

ILLUSTRATION OF DIRECT REFLECTIONS
WITH POINT SOURCE OFF SPHERICAL CENTER

REACTOR CONFIGURATION FOR A LIQUID GASIFICATION PROCESS

CROSS-REFERENCE TO RELATED APPLICATION

Applicants filed a provisional application as a small entity entitled "REACTOR CONFIGURATION FOR BIOMASS GASIFICATION PROCESS" which was accorded Ser. No. 60/073,818 and a filing date of Feb. 5, 1998.

TECHNICAL FIELD

The present invention relates generally to a reaction chamber and more specifically to a reaction chamber within a carbon arc liquid gasification apparatus.

BACKGROUND OF THE INVENTION

In U.S. Pat. No. 5,159,900, one of the inventors herein disclosed a rapid oxidation process to produce a gas for use as a fuel from water and carbon. This gas product is created by the decomposition of water through oxidation. Hydrogen is displaced when a substance is oxidized in water. Rapid oxidation can be forced by using an electrical arc to burn a substance within the water, thereby oxidizing the substance by an electrothermal chemical reaction. The result is the rapid formation of a compound of hydrogen and carbon monoxide gas ($COH_2$). As discussed in U.S. Pat. No. 5,159,900, an electrical arc can be provided by supplying electrical energy to electrodes such that an electrical arc passes therebetween with the temperature of the arc perhaps exceeding 6000° F. The heat and difference of potential between the carbon electrodes ionizes and vaporizes the carbon in an exothermic reaction. Electrons pass through the vaporized carbon causing the carbon vapor to oxidize or burn. The displacement of oxygen in the water by forced rapid oxidation releases carbon monoxide and hydrogen gas. This is an endothermic reaction.

Research has shown that the reaction energy is not being utilized in a manner that is as efficient as possible. Further research has indicated that high intensity light radiation generated during the reaction can be captured and used to improve the efficiency of the process. As with solar radiation, UV radiation created by the reaction can be converted into heat when striking a nonreflective surface. When an opaque reaction chamber is used in the process, the light radiation of the arc is retained within the reaction chamber and is converted into heat energy when striking the chamber surface. This heats the solution and provides improved efficiency. Some of the heat energy is lost in this configuration due to conduction losses through the chamber walls.

A much more efficient way to use the light energy of the electric arc is to reflect and focus the radiant energy into the point of reaction by using a highly reflective reaction chamber. Optimum results are obtained using a spherical chamber. When focused back to the point of reaction, light energy is converted to heat and added to the heat of the reaction. Because this process is an endothermic reaction, the recovered light energy, as heat, will increase the rate of reaction and improve the efficiency of gas production. The efficiency of the reaction is further enhanced when conducted at pressure higher than standard atmospheric pressure.

SUMMARY OF THE INVENTION

It is therefore a general object of the present invention to provide a reactor configuration for a liquid gasification process which enhances the efficiency of the electrothermal chemical reaction.

Another object of the invention is to provide a reaction chamber which is reflective.

Still another object of the invention is to provide a reflective reaction chamber which is generally spherical in shape.

Another object of the invention is to provide a pressurized reaction chamber.

These and other objects will be apparent to those skilled in the art.

The reactor configuration for a liquid gasification process includes an apparatus for liquid gasification such as that described in U.S. Pat. No. 5,159,900. Included in the apparatus for liquid gasification are a reaction chamber at least partially filled with liquid, a pair of electrodes, and means for creating an electrical arc between the electrodes. When the electrical arc is struck, carbon in the reaction chamber is ionized and vaporized while energy is dissipated in the form of high intensity light radiation. Electrons pass though the vaporized carbon, causing the carbon vapor to oxidize or burn. The displacement of oxygen in the liquid by forced rapid oxidation is an endothermic reaction. The electrodes are spaced-apart so that the arc is located generally in the center of the reaction chamber. The interior of the reaction chamber is generally spherical in shape and is light reflective, so as to prevent dissipation of light energy. Optionally, the reaction chamber is substantially sealed and pressurized to further enhance the efficiency of the reaction.

DESCRIPTION OF THE PREFERRED EMBODIMENT

Figure 1:
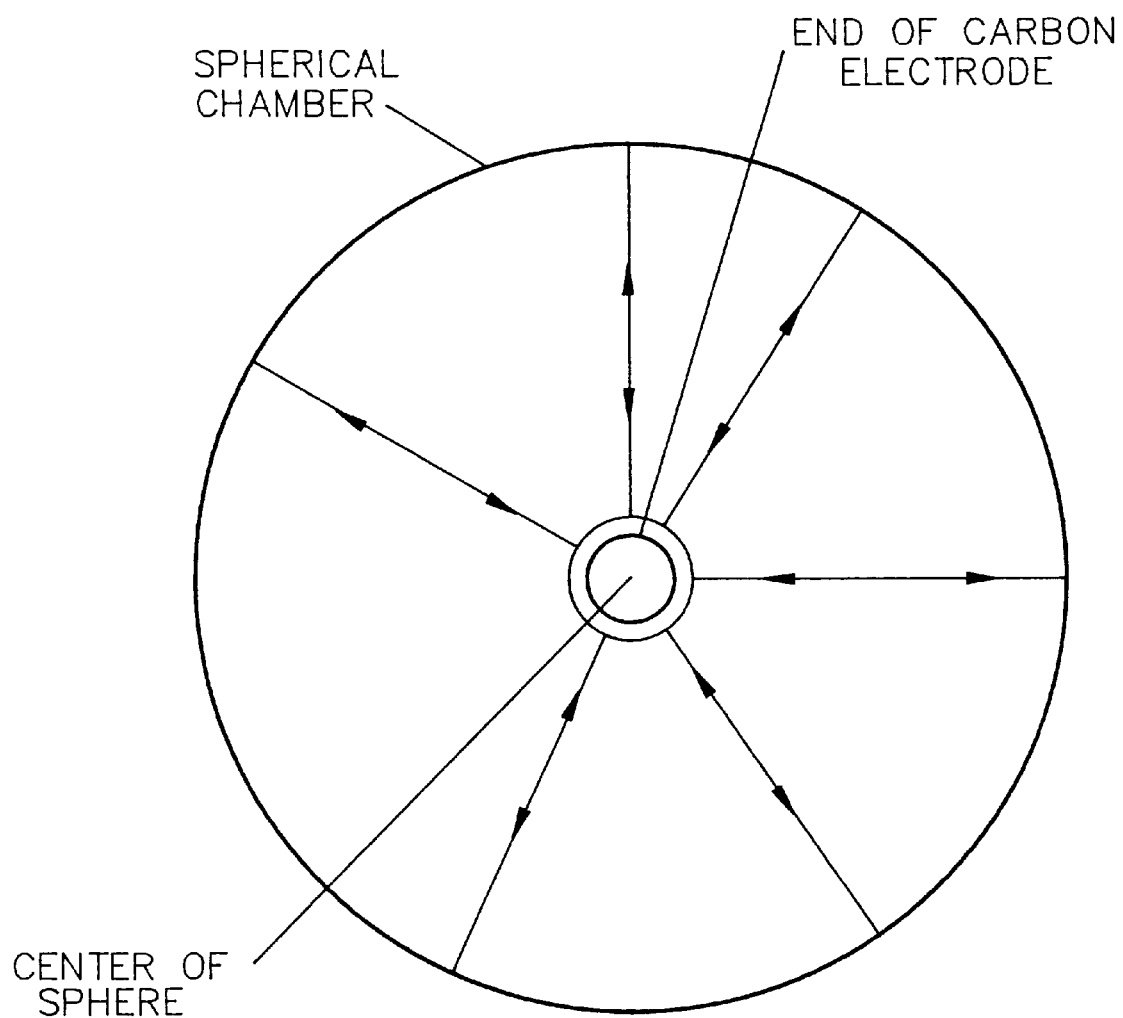
FIG. 1 is an end view of the reaction chamber.

In FIG. 1, the numeral 10 refers to a reaction chamber used in conjunction with a liquid gasification apparatus such as that described in U.S. Pat. No. 5,159,900 (not shown). The reaction chamber 10 is spherical in shape having an interior wall 11. The numeral 12 refers to the center of the reaction chamber. The reaction chamber has an inlet opening 40 for the introduction of liquid. The inlet opening 40 is, preferably, a one-way valve which allows fluid into the reaction chamber, but does not let liquid out of the reaction chamber. The reaction chamber also has an exhaust opening 42 for the discharge of gasified liquid.

Figure 2:
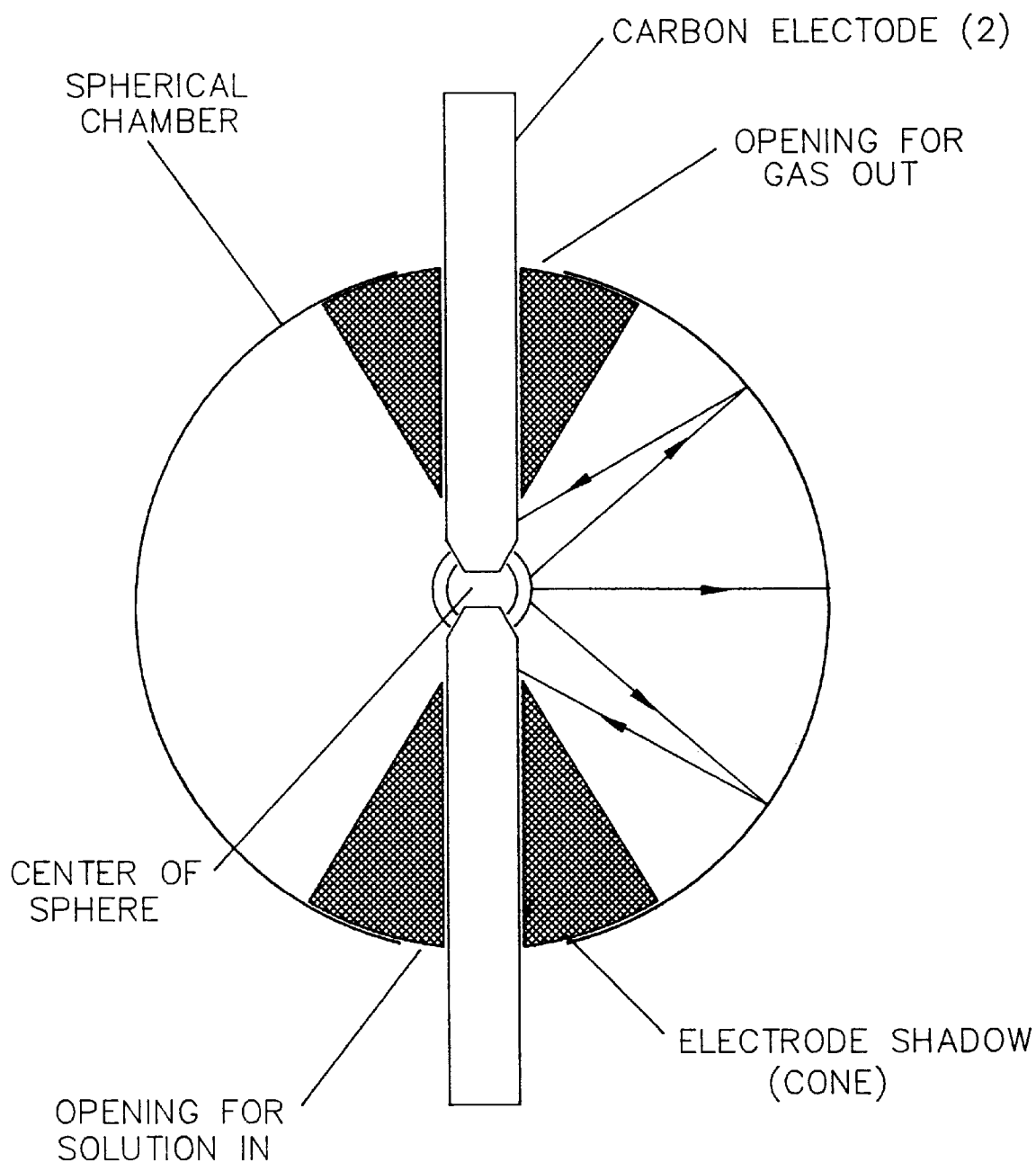
FIG. 2 is a top view of the reaction chamber with the arc in the center of the sphere.
Figure 3:
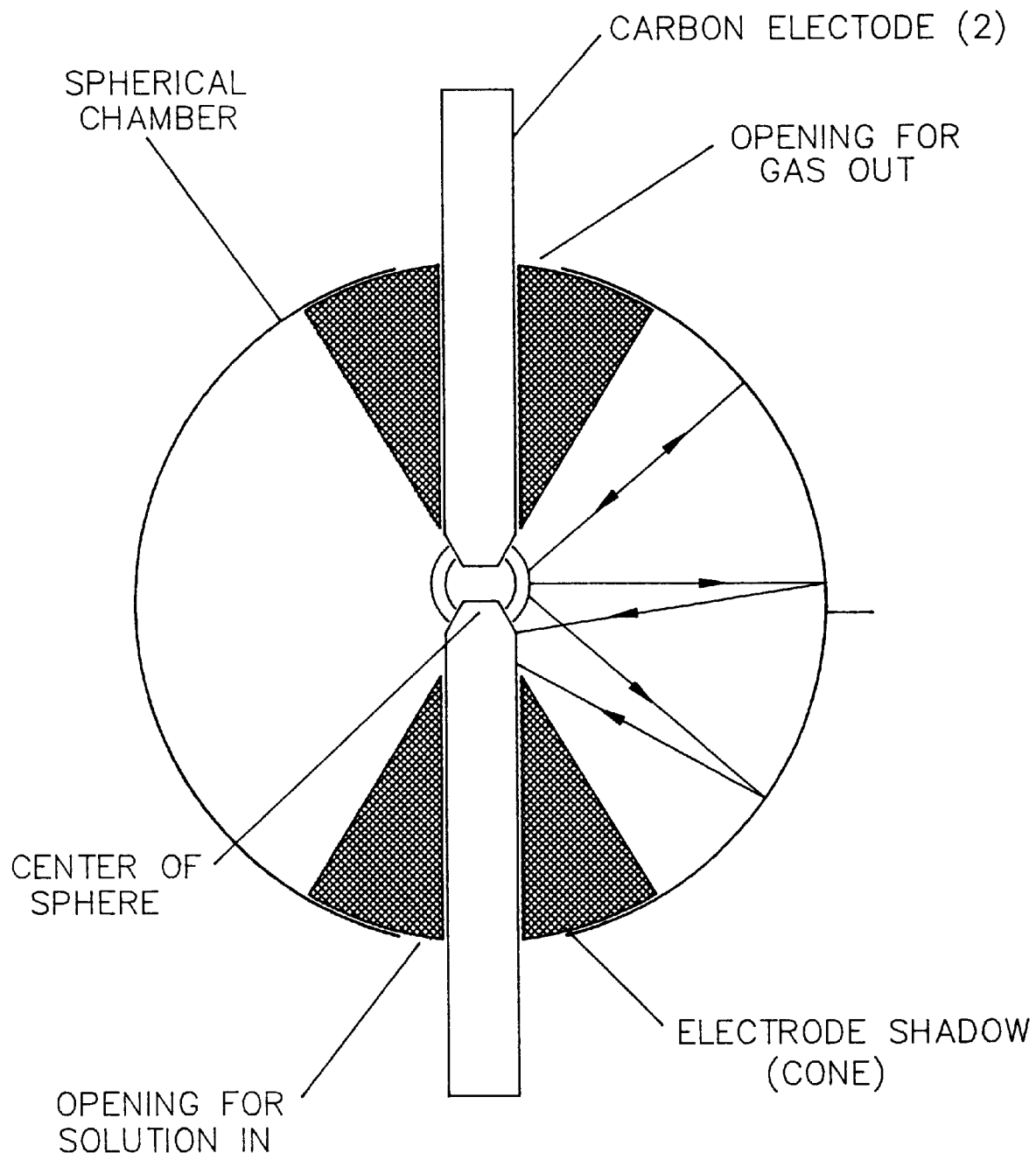
FIG. 3 is a top view of the reaction chamber with the arc off the center of the sphere.

As shown in FIG. 2, electrodes 20 and 22 are provided, each having an interior end proximal the center of the reaction chamber 12. Electrode 20 is supplied with an electrical charge. The charge creates an electrical arc 30 from the interior end of electrode 20 through the liquid in the reaction chamber to the interior end of the electrode 22. After the arc 30 is struck, the interior ends of electrodes 20 and 22 must not be in physical contact. Preferably, each interior end is equidistant from the center of the reaction chamber 12 and diametrically opposed to the interior end of the other electrode. Preferably, the liquid in the chamber is a carbon rich feedstock solution as discussed in U.S. Pat. No. 5,417,817, granted to the applicants. When the electrical arc 30 is struck, carbon in the reaction chamber is ionized and vaporized while energy is dissipated in the form of high intensity light radiation. Electrons pass though the vaporized carbon, causing the carbon vapor to oxidize or burn. The displacement of oxygen in the liquid by forced rapid oxidation is an endothermic reaction.

In the reaction chamber 10 of the present invention, high intensity light radiation caused by the electrical arc 30 travels one of two possible paths. The first possible path of travel of the light within the reaction chamber 10 is opaque and is directly from the electrical arc 30 to either electrode 20 or 22. The other possible path of travel is from the electrical arc 30 to the interior wall 11 of the reaction chamber 10. The interior wall 11 of the reaction chamber 10 is preferably reflective. If the arc 30 is generated at the center of the reaction chamber 12 and the reaction chamber 10 is spherical, light generated by the electrical arc 30 would reflect off the interior wall 11 of the reaction chamber 10 to the site of carbon vapor oxidation. The paths of incidence and reflection of light are designated by the numeral 14. If the electrical arc 30 is generated in a position other than in the center of the reaction chamber 12, light generated by the electrical arc 30 is still reflected by the interior wall 11 of the reaction chamber 10 along the paths of incidence and reflection 14 such that energy is focused generally in the vicinity of carbon vapor oxidation.

Whether light generated by electrical arc 30 strikes either of electrodes 20 or 22, or is reflected off the interior wall 11 of the reaction chamber 10 such that it is focused in the vicinity of the carbon vapor oxidation, the light energy is converted to heat and added to the heat of the reaction. Because the oxidation process involves an endothermic reaction, the recovered light energy, as heat, increases the rate of reaction and improves the efficiency of gas production. The efficiency of the reaction is further enhanced when the reaction chamber 10 is pressurized.

Thus it can be seen that the invention accomplishes at least all of its stated objectives.

We claim:

1. A reactor for a liquid gasification process, comprising:

a reaction chamber having a reflecting interior surface and adapted to be at least partially filled with liquid;

a pair of spaced-apart carbon electrodes disposed in said reaction chamber and adapted to be immersed in the liquid;

means for supplying an electrical current to said electrodes to create an electrical arc between said electrodes.

2. The reactor of claim 1 wherein said reaction chamber has a reflective interior surface that is generally spherical, and has a center.

3. The reactor of claim 2 in which the electric arc is located generally in said center of said reaction chamber.

4. A reactor for a liquid gasification process, comprising:

a pressurized reaction chamber having a reflective interior surface and adapted to be at least partially filled with liquid;

a pair of spaced-apart carbon electrodes disposed in said pressurized reaction chamber and adapted to be immersed in the liquid;

means for supplying an electrical current to said electrodes to create an electrical arc between said electrodes.

5. The reactor of claim 4 wherein said pressurized reaction chamber has an interior surface that is generally spherical, and has a center.

6. The reactor of claim 5 in which the electric arc is located generally in said center of said pressurized reaction chamber.

* * * * *